US006835397B2

(12) United States Patent
Lee et al.

(10) Patent No.: US 6,835,397 B2
(45) Date of Patent: Dec. 28, 2004

(54) CONTROLLED RELEASE ENCAPSULATED BIOACTIVE SUBSTANCES

(75) Inventors: Phillip K. Lee, Pine Bush, NY (US); Paul H. Richardson, McAfee, NJ (US)

(73) Assignee: Balchem Corporation, New Hampton, NY (US)

(*) Notice: Subject to any disclaimer, the term of this patent is extended or adjusted under 35 U.S.C. 154(b) by 0 days.

(21) Appl. No.: 10/342,168

(22) Filed: Jan. 14, 2003

(65) Prior Publication Data
US 2004/0121002 A1 Jun. 24, 2004

Related U.S. Application Data

(63) Continuation-in-part of application No. 10/329,042, filed on Dec. 23, 2002, now abandoned.

(51) Int. Cl.[7] .............................. A23J 1/00; A23B 4/03; B32B 15/02
(52) U.S. Cl. ...................... 424/461; 264/4.3; 264/4.32; 424/458; 424/464; 424/469; 426/33; 426/92; 426/94; 426/96; 426/97; 426/98; 426/519; 426/549; 426/553; 426/554; 426/653; 426/656; 426/391; 426/446; 428/402; 428/402.2; 428/402.24; 428/615; 428/616; 514/1; 514/23; 514/184; 514/474
(58) Field of Search ................................. 264/4.3, 4.32; 424/458, 461, 464, 469; 426/33, 92, 94, 96, 97, 98, 519, 549, 553, 554, 653, 656, 391, 446; 428/402, 402.2, 615, 616; 514/1, 23, 184, 474

(56) References Cited

U.S. PATENT DOCUMENTS

| 2,523,483 A | 9/1950 | Stern |
| 3,913,847 A | 10/1975 | Glatt et al. |
| 4,497,845 A | 2/1985 | Percel et al. |
| 4,511,584 A | 4/1985 | Percel et al. |
| 4,511,592 A | 4/1985 | Percel et al. |
| 4,537,784 A | 8/1985 | Percel et al. |
| 5,707,669 A | 1/1998 | Soltis et al. |
| 6,153,236 A | 11/2000 | Wu et al. |
| 6,251,478 B1 | 6/2001 | Pacifico et al. |
| 6,261,613 B1 | 7/2001 | Narayanaswamy et al. |

FOREIGN PATENT DOCUMENTS

| DE | 3738599 A1 | 5/1989 |
| DE | 19900446 A1 | 7/2000 |
| WO | WO 01/68808 A1 | 9/2001 |

Primary Examiner—Samuel A. Acquah
(74) Attorney, Agent, or Firm—Hoffmann & Baron, LLP

(57) ABSTRACT

The present invention is an encapsulated yeast composite comprising a core comprising yeast and a coating containing an emulsifiable lipid. The yeast includes *Saccharomyces cerevisiae*. The invention also relates to other encapsulated bioactive substance composites. The nature of the coating provides controlled release of the bioactive substance from the encapsulate. The encapsulated composites are useful in the production of food compositions, food products, and animal feed products.

62 Claims, No Drawings

CONTROLLED RELEASE ENCAPSULATED BIOACTIVE SUBSTANCES

This application is a continuation-in-part of U.S. application Ser. No. 10/329,042 filed Dec. 23, 2002 now abandoned.

BACKGROUND OF THE INVENTION

The present invention relates generally to the art of food preparation, and, in particular, to the use of yeast in food. It also relates to the use of bioactive substances which are preferably protected before exposure to other food ingredients and/or animal feed ingredients and/or environmental conditions in or out of food products and/or animal feed products.

Yeast is a living organism which is sensitive to its surrounding environment. Exposure of yeast to, for example, moisture, can destabilize the yeast.

Producers of dry mix packages for bakery mixes experience the limitations of yeast in their dry mix packages. There is sufficient moisture in the flour and the other components in the dry mix package to eventually destabilize the yeast included in the package. Due to the presence of moisture, the yeast begins to activate and produce carbon dioxide while still in the package mix. As a consequence, when the package mix is ready to be used by the consumer, the level of activity of the yeast is insufficient to produce carbon dioxide required to fully expand the cell structure of the dough. Thus, since the dough does not adequately rise, the resulting baked product is organoleptically inferior to the consumer.

One approach to solve this problem is to have the yeast added directly by the consumer. However, this can lead to inconsistency, and erratic performance due to consumer mishandling and limitations of mixing apparatuses and preparation methods.

Another approach is to package the yeast separately in smaller sachets. Therefore, the yeast is separated from the remaining components of the dry mix package. Nevertheless, this is an expensive alternative due to the high packaging costs for small amounts of yeast per sachet. Furthermore, the cost of ensuring a sachet is deposited into each dry mix package substantially adds to the cost of the package mix.

An alternative method to increase the stability of the dry mix package is to dry all the components of the package, including the flour. However, this approach is not effective since the components of the package will eventually reabsorb moisture during storage, to a level that is damaging to the yeast.

U.S. Pat. No. 6,261,613 to Narayanaswamy et al. discloses encapsulating particles, such as yeast, in a fat in a beta prime form (i.e., triglyceride crystals having a blocky symmetry). The coating material can further contain emulsifiers such as those found in hydrogenated vegetable oil. However, the coating only allows release of the yeast in a limited temperature range of about 40° C. to about 55° C.

U.S. Pat. No. 6,251,478 B1 to Pacifico et al. discloses sensitive substances such as Lactobacillus, enzymes, and nutrients encapsulated in a lipid material. The lipid materials disclosed include mono-, di-, and triacylglycerols. However, control of the rate of release of the sensitive substance is not provided.

There is a need to control rate of release of bioactive substances, such as yeast. Depending on the end product desired (e.g., bread), one may require the yeast to be released immediately upon contact with, for example, water. In the alternate, some products may require the rate of release to be delayed for a period of time upon exposure to water, such as, for example, refrigerated dough.

Therefore, there is a need to control rate of release of bioactive substances, especially yeast, in the field of food preparation. It is thus an object of the present invention to provide a stabilized encapsulated yeast having a coating containing a emulsifiable lipid which offers, for example, abrasion resistance, stability in storage, and controlled release of yeast for use in food compositions and food products. It is also an object of the present invention to stabilize bioactive substances which are preferably stabilized, protected and have controlled release as explained above for use in food compositions, food products and/or animal feed products.

SUMMARY OF THE INVENTION

The present invention is based on applicants' surprising discovery that the rate of release of a bioactive substance can be controlled by encapsulating the bioactive substance in a coating containing an emulsifiable lipid and an additive.

Applicants' have also surprisingly discovered that encapsulated bioactive substance composites having a coating consisting essentially of one or more monoglycerides exhibit increased release of the bioactive substance upon exposure of the encapsulated composite to a solvent, such as water.

The present invention includes an encapsulated bioactive substance composite, particularly an encapsulated yeast composite, and compositions thereof, especially food composition and products therefrom. The present invention also includes a method for preparing food compositions and products using the unique composite.

The encapsulated yeast composite includes a core containing yeast and a coating which contains an emulsifiable lipid. The coating protects the yeast from destabilizing factors (e.g., solvents) and also provides controlled release of the yeast when the composite is exposed to a solvent. In a preferred embodiment, the solvent is an aqueous solvent, such as water.

The emulsifiable lipid is any lipid which emulsifies when exposed to a solvent, and has a melting point which allows the lipid to be a solid at typical storage temperatures. The emulsifiable lipid can be a vegetable or animal derived-lipid. In a preferred embodiment, the emulsifiable lipid is a monoglyceride.

In a preferred embodiment, the encapsulated bioactive substance composite contains yeast surrounded by a coating which consists essentially of one or more monoglycerides.

The yeast useful in the present invention is any dry yeast, including, for example, *Saccharomyces cerevisiae*. In a preferred embodiment, the yeast is INSTANT yeast. The minimum amount of yeast present in the composite is about 5% by weight of the composite, preferably about 30%, and more preferably about 50% by weight of the composite. The maximum amount of yeast present in the composite is about 95% by weight of the composite, preferably about 90%, and more preferably about 85% of the composite.

The food composition which contains the encapsulated yeast composite can be a dry mix package, or a frozen or refrigerated dough. In a preferred embodiment, the food composition is a dry mix package.

The food product includes the composite which is combined with other food ingredients. The combination is subjected to a solvent which releases the yeast. In a preferred embodiment, the addition of a solvent to the combination results in a dough. The dough can be proofed and baked to obtain a food product. Preferably, the food product is a bakery product, and more preferably, a bread product.

As a result of the present invention, yeast is provided which can tolerate storage conditions (e.g., moisture, elevated temperature, oxygen, etc.) encountered by food compositions, such as dry mix packages and doughs. The coating of the encapsulated composite protects the yeast from the environment and provides emulsification in a solvent without detracting from the abrasion resistance of the coating. The emulsification of the coating in a solvent allows for release of the yeast. The emulsification of the coating can be controlled by including additives with the emulsifiable lipid. Controlling emulsification of the coating allows the coating to protect the yeast in compositions such as frozen and refrigerated doughs.

Other bioactive substances which can be encapsulated and afforded protection and controlled release in accordance with the present invention include, for example, bacteria, preferably probiotics, enzymes, and nutrients, such as vitamins, minerals, and antioxidants.

In another embodiment, the invention relates to a method of controlling the rate of release of a bioactive substance from an encapsulated composite upon exposure to a solvent. The method comprises blending an emulsifiable lipid with an amount of one or more additives to obtain a blend; and coating the bioactive substance with the blend to form an encapsulated bioactive substance containing a core which contains the bioactive substance and a coating which contains the blend, wherein the emulsifiable lipid and additive are not the same, and wherein the rate of release of the bioactive substance from the encapsulated composite upon exposure to a solvent is decreased as the amount of additive is increased. In the alternative, the rate of release of the bioactive substance from the encapsulated composite upon exposure to a solvent is increased as the amount of additive is decreased.

In a further embodiment, the invention provides a method for controlling rate of release of a bioactive substance from an encapsulated composite upon exposure to a solvent. The method includes coating the bioactive substance with an amount of an emulsifiable lipid to form an encapsulated bioactive substance composite, wherein the rate of release of the bioactive substance from the encapsulated composite is decreased as the amount of emulsifiable lipid based on total weight of the encapsulated composite is increased. In the alternative, the rate of release of the bioactive substance from the encapsulated composite is increased as the amount of emulsifiable lipid based on total weight of the encapsulated composite is decreased.

As a result of the present invention, bioactive substances are provided which can tolerate storage conditions (e.g., moisture, heat, oxygen, etc.) encountered by food compositions, food products and/or animal feed products. The coating of the encapsulated composite protects the bioactive substance from the environment and provides emulsification in a solvent without detracting from the abrasion resistance of the coating. The emulsification properties of the coating in a solvent allows for controlled release of the bioactive substance in a food composition, food product, and/or animal feed products.

For a better understanding of the present invention, together with other and further advantages, reference is made to the following detailed description, and its scope will be pointed out in the claims.

DETAILED DESCRIPTION OF THE INVENTION

The invention relates to an encapsulated bioactive substance, particularly yeast. An encapsulated bioactive substance is a composite which includes a core containing a bioactive substance and a coating which contains an emulsifiable lipid. Additives can be blended with the emulsifiable lipid to control the rate of release of the bioactive substance.

"Bioactive substances" as used herein, refers to any material which has a functional or nutritive activity and which typically exhibits low stability, and/or a reduction or loss of bio-effectiveness when exposed to unfavorable conditions. The unfavorable conditions can include, for example, moisture, elevated temperature, oxygen, and acidic or basic pH. When the bioactive substance is exposed to such conditions, the bioactive substance can, for example, decompose, disassociate, deactivate, and/or lose viability. An example of a bioactive substance is yeast.

Yeast useful in the present invention is any dry yeast. For example, the yeast can be *Saccharomyces cerevisiae*. In a preferred embodiment, the yeast is INSTANT yeast.

INSTANT yeast as used herein is a highly active yeast which does not need to be prefermented (i.e., reconstituted with water and sugar) before use. INSTANT yeast activates rapidly in warm water. Some examples of INSTANT yeast include Rapid Rise Yeast and Bread Machine Yeast.

In addition to the functional property of yeast described above, yeast can also have nutritive properties. For example, yeast can be mineral enriched, and can assist in digestion and/or beneficially improve the intestinal microbial balance of a host. Beneficial yeast which can be encapsulated in accordance with the present invention include, but are not limited to, *Saccharomyces boulardii*, *Saccharomyces cerevisiae*, and *Saccharomyces cerevisiae boulardii*.

Other bioactive substances are also contemplated in the present invention. These include, but are not limited to, for example, microorganisms, enzymes, flavors, and nutrients, such as vitamins, minerals, and antioxidants.

Microorganisms include any unicellular organism, such as, for example, bacteria, algae, fungi, and protozoa. The microorganisms can be naturally occurring strains or laboratory-bred strains. The laboratory-bred strains can contain recombinant genes or modifications to express unique biological properties compared to those of the naturally occurring strains. For example, the microorganism can contain a recombinant gene for expression of a protein. Methods for making recombinant and/or modified microorganisms are known to those in the art. See for example, *Molecular Cloning, A Laboratory Manual* (Sambrook, et al., Second Edition, Cold Spring Harbor). Preferably, the microorganism is a bacteria.

Bacteria useful in the present invention can be any bacteria. Preferably, the bacteria functions as a probiotic. A probiotic is typically a microbial supplement which beneficially improves the microbial balance. For example, probiotics can aid in digestion and can help prevent illness by promoting the growth of good bacteria in the digestive tract of a host. Bacteria which are useful as probiotics include, but are not limited to, Lactobacillus, *Bifidobacterium longum, Pediococcus acidilactic*, and *Enterococcus faecium*. Preferably the Lactobacillus is *Lactobacillus acidophilus* or *Lactobacillus rhamnosus*.

Enzymes include any protein molecule which catalyzes a chemical reaction. Enzymes useful in the present invention include, for example, lactase, lipase, esterase, pectinase, amylase, phospholipase, and glucoamylase.

Nutrients as used herein are substances which have a real and/or perceived beneficial health benefits, and do not have long-term harmful biological effect(s) on the user. The beneficial health benefits can include, for example, supplementing nutritional deficiencies in a diet. Examples of nutrients include, but are not limited to vitamins, minerals, and antioxidants.

A vitamin is any organic substance which is typically essential for normal metabolic processes. The vitamin can be any vitamin. Examples of vitamins include, but are not limited to, vitamin A (retinol), B1 (thiamine), B2 (riboflavin), B complex, B6 (pyridoxine), B12 (cobalamin), C (ascorbic acid), D (cholecalciferol), E (tocopherol), F (linoleic acid), G, H (biotin), and K, and choline, folic acid, inositol, niacin, pantothenic acid, and para-aminobenzoic acid.

Minerals are naturally occurring inorganic substances which are typically essential to nutrition. The mineral can be any mineral. Examples of minerals include, but are not limited to, boron, calcium, chromium, copper, iron, magnesium, manganese, molybdenum, nickel, phosphorus, selenium, silicon, tin, vanadium, and zinc.

Antioxidants are substances which inhibit oxidation and are capable of counteracting the damaging effects of oxidation. The antioxidant can be an enzyme or other organic substance, such as vitamin E or beta-carotene.

The bioactive substance is present in the composite at a minimum amount of about 5% by weight of the encapsulated composite, preferably about 30%, and more preferably about 50% by weight of the encapsulated composite. The maximum amount of bioactive substance present in the encapsulated composite is about 95% by weight of the composite, preferably about 90%, and more preferably about 85% of the encapsulated composite.

To protect and stabilize the bioactive substance from unfavorable conditions, the bioactive substance (core) is encapsulated in a continuous coating containing an emulsifiable lipid. "Encapsulate" as used herein means that the coating completely surrounds the bioactive substance.

Coatings which are useful in the present invention are continuous coatings. By "continuous," it is meant that the bioactive substance is uniformity protected. The continuous coating of the present invention fully surrounds and provides protection of the bioactive substance from conditions, such as moisture, temperature, and conditions encountered during storage, and also provides controlled release of the bioactive substance. The rate of release of the bioactive substance is controlled by the addition of additives as described below. When the composites are exposed to a solvent, the solvent interacts with the emulsifiable lipid in the coating and results in emulsification of the coating and release of the bioactive substance.

As used herein, an "emulsifiable lipid" is any lipid which emulsifies or creates an emulsion when exposed to a solvent. An "emulsion" is a liquid formed by the suspension of a very finely-divided lipid in a liquid.

The emulsifiable lipid can be any lipid or lipid-derived material which emulsifies or creates an emulsion when exposed to a solvent, yet has a melting point which allows the emulsifiable lipid to be a solid at typical storage temperatures, for example, 23° C. "Emulsifiable lipids" as used herein means those lipids which contain at least one hydrophilic group and at least one hydrophobic group, and have a structure capable of forming a hydrophilic and hydrophobic interface in a solvent. These chemical and/or physical properties, mentioned above, of an emulsifiable lipid permit emulsification. Examples of interfaces include, for example, micelles and bilayers. The hydrophilic group can be a polar group and can be charged or uncharged.

The emulsifiable lipid can be derived from animal or vegetable origins, such as, for example, palm kernel oil, soybean oil, cottonseed oil, canola oil, and poultry fat. The lipid is preferably hydrogenated, and can be saturated or partially saturated. Examples of emulsifiable lipids include, but are not limited to, monoglycerides, diglycerides, fatty acids, esters of fatty acids, phospholipids, salts thereof, and combinations thereof.

Monoglycerides and diglycerides can be formed naturally in a biological system, as well as by partial or complete hydrolysis of triglycerides and distillation in commercial manufacturing. These methods are known to those skilled in the art. Monoglycerides, also known as monoacylglycerols, are molecules made up of a glycerol and a fatty acid bound as an ester. Diglycerides (i.e., diacylglycerols) are molecules made up of a glycerol and two fatty acids, each fatty acid is bound to the glycerol as an ester. Depending upon the nature of the fatty acid molecule(s) contained in the mono- or diglyceride, the properties of the emulsifiable lipid may vary. For example, hydrogenated palm distilled monoglyceride demonstrates an increased ability to emulsify compared to a monoglycerides with a longer fatty acid chain.

Phospholipids can be, for example, monoacyl and diacyl phospholipids. Examples of phospholipids include, but are not limited to, phosphatidic acid, phosphatidyl choline, phosphatidyl ethanolamine, phosphatidyl inositol, phosphatidyl serine, phosphatidyl glycerol, and diphosphatidyl glycerol.

The fatty acids can have a minimum carbon chain length of 4 carbon atoms, and preferably 6 carbon atoms. The maximum carbon chain length present in the fatty acid is 24 carbon atoms, and preferably 22 carbon atoms. The fatty acid can be saturated or unsaturated (e.g., partially saturated). Examples of such fatty acids include, but are not limited to lauric acid, myristic acid, palmitic acid, stearic acid, palmitoleic acid, oleic acid, ricinoleic acid, and linoleic acid.

The fatty acid esters can be mono- or diglycerol esters formed from fatty acids having from 4 to 24 carbon atoms, such as for example glyceryl distearate, glyceryl monostearate, glyceryl dipalmitate, glyceryl monopalmitate, glyceryl dilaurate, glyceryl didocosanoate, glyceryl monodocosanoate, glyceryl monocaprate, glyceryl dicaprate, glyceryl monomyristate, glyceryl dimyristate, glyceryl monodecenoate, or glyceryl didecenoate.

The emulsifiable lipid is preferably a food grade emulsifiable lipid. Some examples of food grade emulsifiable lipids include sorbitan monostearates, sorbitan tristearates, calcium stearoyl lactylates, and calcium stearoyl lactylates. Examples of food grade fatty acid esters which are emulsifiable lipids include acetic acid esters of mono- and diglycerides, citric acid esters of mono- and di-glycerides, lactic acid esters of mono- and di-gylcerides, polyglycerol esters of fatty acids, propylene glycol esters of fatty acids, and diacetyl tartaric acid esters of mono- and diglycerides.

In a preferred embodiment, the emulsifiable lipid is a monoglyceride. Preferably, the coating contains 100% distilled monoglycerides from hydrogenated palm oil.

In another preferred embodiment, when the bioactive substance is yeast, the coating consists essentially of one or more monoglycerides.

As mentioned above, the coating can further contain one or more additives. The additive can be used to control the rate of release of the bioactive substance from the encapsulated composite upon exposure of the encapsulated composite to a solvent and is described below.

In another embodiment, the invention relates to a method of controlling the rate of release of a bioactive substance from the encapsulated composite. The method includes blending an emulsifiable lipid with one or more additives to obtain a blend, and coating the bioactive substance with the blend to form an encapsulated bioactive substance containing a core which contains the bioactive substance and a coating which contains the blend of emulsifiable lipid and additive(s). The rate of release of the bioactive substance from the encapsulated composite upon exposure with a solvent is decreased as the amount of additive is increased. In the alternative, the rate of release of the bioactive substance from the encapsulated composite upon exposure with a solvent is increased as the amount of additive is decreased. Thus, the nature of the coating allows for controlled release of the bioactive substance from the encapsulate.

Blending an emulsifiable lipid with an additive can be done by any method known to those in the art. For example, lipids can be blended in a molten state in a tank with agitation, usually under nitrogen to prevent oxidation of any unsaturated fatty acids.

The additive can be an emulsifiable lipid, a non-emulsifiable lipid, or combination thereof. However, the additive and the emulsifiable lipid can not be the same. For example, if the emulsifiable lipid is a monoglyceride, then the additive cannot be the same monoglyceride, but can be a different monoglyceride. As discussed above, monoglycerides can vary, for example, in their fatty acid group. The inclusion of different emulsifiable lipids having different chemical and/or physical properties related to emulsification of the coating, can be used to control emulsification of the coating and release of the bioactive substance. For instance, in addition to the preferred distilled monoglycerides from hydrogenated palm oil, diglycerides can be blended with the monoglyceride to control emulsification of the coating and thus control (e.g., decrease) the rate of release of the bioactive substance from the composite.

Non-emulsifiable lipids generally do not emulsify by themselves. Non-emulsifiable lipids can be used as additives so long as the properties of the coating, and constituent lipids, permit emulsification. Non-emulsifiable lipids, such as, for example, triglycerides, can be blended with an emulsifiable lipid of the present invention. The inclusion of one or more additives with an emulsifiable lipid of the present invention is used to control emulsification of the coating and release of the bioactive substance. For example, the additive, triglyceride, can be blended with monoglycerides (e.g., an emulsifiable lipid), to control emulsification of the coating and thus control (e.g., decrease) the rate of release of the bioactive substance from the composite. As a further example, one or more additives, such as a diglyceride and a triglyceride can be blended with the emulsifiable lipid to control the rate of release of the bioactive substance.

Non-emulsifiable lipids do not possess the chemical and/or physical properties related to emulsification as described above and include any lipid, lipid derived material, waxes, organic esters, or combinations thereof. The non-emulsifiable lipid can be derived from animals, vegetables, mineral, or synthetic origins. The non-emulsifiable lipid is preferably hydrogenated, and can be saturated or partially saturated, and includes, but is not limited to triglycerides. In a preferred embodiment, the coating contains a blend of monoglycerides and triglycerides.

The wax can be paraffin wax; a petroleum wax; a mineral wax such as ozokerite, ceresin, or montan wax; a vegetable wax such as, for example, carnuba wax, bayberry wax or flax wax; an animal wax such as, for example, spermaceti; or an insect wax such as beeswax.

Additionally, the wax material can be an ester of a fatty acid having 12 to 31 carbon atoms and a fatty alcohol having 12 to 31 carbon atoms, the ester having from a carbon atom content of from 24 to 62, or a mixture thereof. Examples include myricyl palmitate, cetyl palmitate, myricyl cerotate, cetyl myristate, ceryl palmitate, ceryl certate, myricyl melissate, stearyl palmitate, stearyl myristate, and lauryl laurate.

The emulsifiable lipid is present in the coating in a minimum amount of about 1%, preferably about 5%, and more preferably about 15%. The maximum amount of emulsifiable lipid present in the coating is 100%, preferably about 95%, and more preferably about 90%.

The rate of release is the amount of bioactive substance released per time that has elapsed upon exposure of the encapsulated composite to a solvent. For example, the rate of release of a bioactive substance in an encapsulated composite with a coating containing, for example, a blend of 50% triglycerides and 50% monoglycerides, is decreased compared to an encapsulated composite with a coating containing a blend of 1% triglycerides and 99% monoglycerides.

In a further embodiment, the invention provides a method for controlling rate of release of a bioactive substance from an encapsulated composite upon exposure to a solvent. The method includes coating the bioactive substance with an amount of an emulsifiable lipid to form an encapsulated bioactive substance composite, wherein the rate of release of the bioactive substance from the encapsulated composite is decreased as the amount of emulsifiable lipid based on total weight of the encapsulated composite is increased. In the alternative, the rate of release of the bioactive substance from the encapsulated composite is increased as the amount of emulsifiable lipid based on total weight of the encapsulated composite is decreased. The emulsifiable lipid useful in this embodiment can consists essentially of one or more monoglycerides.

For example, an encapsulated composite can contain 15% by weight of emulsifiable lipid, such as, monoglyceride and 85% by weight of a bioactive substance, based on total weight of the encapsulated composite. An encapsulated composite, having 1% by weight of emulsifiable lipid, for instance, will have an increased rate of release of the bioactive substance from the encapsulated composite compared to an encapsulated composite having 60% by weight of emulsifiable lipid.

In addition to the nature (e.g., lipid composition) of the coating as described above, the rate of release of a bioactive substance from an encapsulated composite may also depend upon, for example, the bioactive substance being encapsulated, the environmental conditions to which the encapsulated composite is exposed to, the type of solvent used, the amount of solvent used, and/or shear (e.g., mixing).

The coating can further contain components which enhance the organoleptic properties of the encapsulated composite, food compositions, food products, and/or animal feed products which would benefit from the encapsulated composites of the present invention. Examples of such components include, but are not limited to, preservatives and flavors.

The coating continuously coats (i.e., surrounds) the bioactive substance such that the bioactive substance is protected from the surrounding environment until it is released at the appropriate time. The appropriate time useful in the present invention is determined by controlling the time a solvent is added to the composite and the nature of the coating. Thus, the coating protects the bioactive substance and also provides controlled release of the bioactive substance.

The solvent can be an aqueous solvent. The aqueous solvent interacts with the hydrophilic groups present in the emulsifiable lipid and disrupts the continuity of the coating, resulting in an emulsion between the aqueous solvent and the lipids in the coating, thus releasing the bioactive substance from the composites.

Aqueous solvents are liquids which contain essentially water, e.g., milk, water, etc. Preferably, the aqueous solvent is water.

The solvent can also be a mixture of an aqueous solvent and a nonpolar solvent, such as oil. For example, a solution of water and oil can be added during preparation of a dough containing encapsulated yeast composites of the present invention. The aqueous solvent interacts with the hydrophilic groups present in the emulsifiable lipid in the coating of the encapsulated composites. The nonpolar solvent interacts with the hydrophobic groups present in the emulsifiable lipid in the coating. As a result, the solvent disrupts the continuity of the coating, creating an emulsion between the solvent and lipids in the coating, and release of the bioactive substance from the composites.

The coating protects the bioactive substance from unfavorable conditions, such as temperature, heat, moisture, oxygen, etc, during storage. Thus, the encapsulated composites of the present invention can be stored at room, refrigeration, or frozen temperatures for up to a year or more. Typically, room temperature is from about 60° F. to about 80° F. Refrigeration temperature is usually from about 34° F. to about 46° F. and frozen temperatures are typically less than about 20° F.

The method of applying the continuous coating to the bioactive substance is not critical, forms no part of the present invention, and can be performed in any manner so long as the coating provides the bioactive substance with the desired degree of protection and release. The bioactive substance can be encapsulated in an emulsifiable lipid by any method known to those in the art. For example, the bioactive substance can be suspended in a molten emulsifiable lipid and the suspension sprayed into a "freezing chamber."

Alternatively, the bioactive substance can be coated with a molten emulsifiable lipid in a fluidized bed apparatus. U.S. Pat. No. 4,511,584 at columns 3–5; U.S. Pat. No. 4,537,784 at columns 4–5; U.S. Pat. No. 4,511,592 at column 4; and U.S. Pat. No. 4,497,845 at column 4, disclose methods of applying a lipid coating to granular particles in a fluidized bed apparatus. In essence, granular particles are introduced into a fluidized bed chamber. The coating material is then applied to the granular particles by spraying the coating material into the fluidized bed chamber. The methods disclosed in U.S. Pat. No. 4,511,584; U.S. Pat. No. 4,537,784; U.S. Pat. No. 4,511,592; and U.S. Pat. No. 4,497,845 can be adapted for applying a coating containing a emulsifiable lipid to a bioactive substance in a fluidized bed apparatus. The relevant portions of U.S. Pat. No. 4,511,584; U.S. Pat. No. 4,537,784; U.S. Pat. No. 4,511,592; and U.S. Pat. No. 4,497,84 are hereby incorporated by reference.

The coating also protects and stabilizes the bioactive substance from conditions (as described above) associated with preparation and storage of food compositions, food products, and/or animal feed products until release of the bioactive substance at the appropriate time.

Food compositions contemplated as part of the present invention are those food compositions which beneficially include an encapsulated bioactive substance composite having a coating containing an emulsifiable lipid. The compositions can contain other ingredients, such as, flour, dry eggs, sugar and salt. The amounts and proportions of ingredients to include in the compositions of the present invention are known to those skilled in the art. The composition can, for example, be a dry mix package. The dry mix package can be, for example a drink mix, such as protein drink mix or a digestive aid drink mix containing, for example, encapsulated probiotics. Other examples of dry mix packages include, for example, a dry cookie mix, which can contain, for example, encapsulated probiotics. If the dry mix package contains encapsulated yeast, the dry mix package preferably contains the necessary particulate components to form a dough upon addition of a solvent. The food composition can also be a frozen or refrigerated dough, such as for example bread dough or cookie dough.

The dry mix package can be stored at room, refrigeration, or frozen temperatures, without harmful effects on the bioactive substance due to protection afforded by the emulsifiable coating. Preferably, the dry mix package is stored at room temperature. The dry mix packages can be stored for an extended period of time. Typically, the storage period can be up to one year or more.

In another embodiment, the invention relates to a food product and/or animal feed product, and method of preparing a food product and/or animal feed product containing encapsulated bioactive substance composites of the present invention. A food product and/or animal feed product can be prepared by combining encapsulated bioactive substance composites of the present invention with other ingredients. These components can be combined by any method known in the art. The method can, for example, include mechanical means, such as a mixer, or manual means, such as by hand. Examples of other ingredients include, but are not limited to, flour, eggs, sugar and salt. The amounts and proportions of encapsulated bioactive substance composites and the other ingredients in a particular food product and/or animal feed product are known to those skilled in the art.

For example, if the encapsulated composites contain yeast, the combination formed can be a dough. Proofing is usually one of the steps for preparing a food product from a dough. Proofing is a process where yeast converts sugar into carbon dioxide, thereby allowing the dough to rise.

The dough (e.g., frozen, refrigerated dough, or dough obtained from a dry mix package) can be proofed at any temperature that is not detrimental to the viability of the yeast. For example, the dough can be proofed at a temperature from about 85° F. or lower, to about 110° F. Typically, the dough is proofed from about 90° F. to about 105° F. After proofing, the dough is baked at a temperature known to those skilled in the art, to provide a food product (e.g., bread).

The food product can be any ingestible composition, which beneficially includes an encapsulated bioactive substance composite of the present invention. The food product can be in the form of a solid, liquid, or a semi-solid/semi-liquid. The food product can be any comestible composition, including a dietary supplement. Examples of food products include, but are not limited to cookies, pizza crust, bakery products, juices, dairy products, such as ice cream, milk, and yogurt. The bakery product can be, for example, a roll, bun, biscuit, or bread. Preferably, the bakery product is a bread product.

The animal feed product can be any ingestible composition, which beneficially includes an encapsulated bioactive substance composite of the present invention. The animal feed product can be in the form of a solid (e.g., pellets), liquid, or a semi-solid/semi-liquid. The animal can be any animal, such as, for example, baboons and other primates, pet animals, such as dogs and cats, laboratory animals such as rats and mice, and farm animals, such as horses, sheep, and cows. Examples of animal feed products include livestock feed, pet food, and animal pellets.

The type of encapsulated bioactive substance to use in a particular food product and/or animal feed products is known to those in the art. For instance, if the food product is a bread product, one in the art would know to use the encapsulated yeast composites of the present invention.

EXAMPLES

Example 1

Encapsulation of Yeast with Distilled Hydrogenated Palm Monoglyceride Blend

Yeast, such as INSTANT yeast, is coated by spraying the molten distilled monoglyceride blend onto the yeast using an encapsulation process. An example of an encapsulation process is a fluidized bed spray applicator as shown in U.S. Pat. No. 3,913,847 and is hereby incorporated by reference in its entirety. The method of coating is not limited, however, to the process shown in U.S. Pat. No. 3,913,847. One of ordinary skill in the art will appreciate that the present invention may also be practiced utilizing other encapsulation processes, such as spray chilling and spinning disk.

The monoglyceride coating protects the yeast by resisting abrasion, and functions as a barrier to oxygen and moisture. The encapsulated yeast composites result in extended storage of the yeast.

Example 2

Improved Shelf Stability of Encapsulated Yeast Composites in a Bread Dry Mix

Encapsulated yeast composites were prepared with 100% hydrogenated palm distilled monoglyceride according to the method described in Example 1. The resulting composite contained 15% coating and 85% yeast.

The encapsulated yeast composites were stored at ambient humidity (40% to 50% relative humidity) for 10 weeks. Samples of each were pulled weekly and performance was compared to raw yeast (stored under identical conditions) in a bread-leavening test.

Dough formulas for Bread Machine baking are as follows:

| Ingredient | Formula 1 (g) | Formula 2 (g) |
| --- | --- | --- |
| Bread flour | 456 | 456 |
| Sugar | 19.74 | 19.74 |
| Salt | 10.29 | 10.29 |
| Non fat dried milk | 7.43 | 7.43 |
| Shortening Flakes | 18 | 18 |
| Fleischmann's yeast | 5.08 | — |

-continued

| Ingredient | Formula 1 (g) | Formula 2 (g) |
| --- | --- | --- |
| Encapsulated yeast (85% active) | — | 5.98 |
| Water | 251.39 | 251.39 |

The ingredients were added to a commercial bread machine and processed according to the manufacturer's recommendations. During the mixing stage, upon exposure of the encapsulated yeast composite with water, the yeast is released. After baking was completed, the loaves were cooled and cut for inspection and measured for rise.

The results of the storage tests are presented in Table 1 below:

TABLE 1

Effect of Encapsulation on the Storage Stability of Yeast

| Week | Formula 1 (cm rise) | Formula 2 (cm rise) |
| --- | --- | --- |
| 0 | 18.5 | 18.3 |
| 1 | 18.5 | 19.5 |
| 3 | 18.5 | 18.9 |
| 5 | 16.7 | 18 |
| 7 | 17 | 18.2 |
| 8 | 16 | 18.5 |
| 10 | 15.4 | 18.1 |

As shown in the above table, the encapsulated yeast resulted in a superior rise compared to unencapsulated yeast stored under identical conditions. Therefore, the coating of the encapsulated yeast composite which contains an emulsifiable lipid, offers the yeast significant protection against conditions encountered during storage.

As a result of the present invention, composites can be prepared (in compositions and products therefrom) which protects the yeast during shelf storage, such as those encountered in a pre-formulated bread machine product, to provide excellent leavening performance. Furthermore, extended storage times would greatly benefit from the use of encapsulated yeast composites versus unencapsulated yeast

Example 3

Improved Shelf Stability of Encapsulated Yeast Composites in a Frozen Dough

To evaluate 70% active yeast encapsulated with a 90% hydrogenated vegetable oil/10% distilled monoglyceride coating; doughs were prepared with the following formulations:

| Ingredient | Formulation 1 (g) | Formulation 2 (g) |
| --- | --- | --- |
| Bread flour | 456 | 456 |
| Sugar | 19.74 | 19.74 |
| Salt | 10.29 | 10.29 |
| Non fat dried milk | 7.43 | 7.43 |
| Fleischmann's Yeast | 5.08 | — |
| Shortening flakes | 18 | 18 |
| Water | 251.39 | 251.39 |
| 70% active yeast encapsulate | — | 7.26 |

After preparing the doughs according to formulation 1 and 2, the doughs were frozen at 0° F. for 3 days and then refrigerated at 38° F. for 24 hours.

After storage, the doughs were proofed at 100° F. for 1 hour then baked at 375° F. for 15 minutes. Formulation 1 gave some rise, whereas formulation 2 provided an excellent higher rise. The observation of bread rise demonstrated improved refrigeration and frozen storage stability for the encapsulated yeast (formulation 2) as detailed in table 2 below.

TABLE 2

Effect of Encapsulation on the Frozen Storage Stability of Yeast

|  | Formula 1 (cm rise) | Formula 2 (cm rise) |
| --- | --- | --- |
| Initial* | 7.7 | 8.6 |
| Post Freeze | 6.4 | 6.9 |

*Fresh dough held at room temperature for 2 hours, then proofed and baked as described above As shown in the above table, the encapsulated yeast resulted in a superior rise compared to unencapsulated yeast stored under identical conditions. Therefore, the coating of the encapsulated yeast composite which contains an emulsifiable lipid, offered the yeast significant protection against conditions encountered in frozen doughs.

Therefore, due to the amount of additives present in the coating, the rate of release of the bioactive substance from the encapsulated composite can be decreased, thus affording protection of the yeast in refrigerated and frozen doughs.

As a result of the present invention, composites can be prepared (in compositions and products therefrom) which protects the yeast during storage, such as those encountered during refrigeration or frozen storage and in dough preparations, to provide excellent leavening capabilities. Furthermore, extended storage times would greatly benefit from the use of encapsulated yeast composites versus unencapsulated yeast.

Thus, while there have been described what are presently believed to be the preferred embodiments of the invention, changes and modifications can be made to the invention and other embodiments will be know to those skilled in the art, which fall within the spirit of the invention, and it is intended to include all such other changes and modifications and embodiments as come within the scope of the claims as set forth herein below.

What is claimed is:

1. An encapsulated bioactive substance composite comprising:
   (a) a core which comprises a bioactive substance; and
   (b) a coating comprising an emulsifiable lipid, wherein the coating continuously coats the bioactive substance, and wherein the emulsifiable lipid emulsifies upon exposure to a solvent.

2. A composite according to claim 1, wherein the coating consists essentially of one or more monoglycerides and wherein the bioactive substance is yeast.

3. A composite according to claim 1, wherein said coating comprises hydrogenated palm distilled monoglycerides.

4. A composite according to claim 1, wherein the coating further contains one or more additives.

5. A composite according to claim 4, where said additive is a diglyceride, triglyceride, or combination thereof.

6. A composite according to claim 1, wherein said emulsifiable lipid is a vegetable derived-lipid.

7. A composite according to claim 1, wherein said emulsifiable lipid is an animal derived-lipid.

8. A composite according to claim 1, wherein said emulsifiable lipid is a monoglyceride, diglyceride, or combination thereof.

9. A composite according to claim 1, wherein said emulsifiable lipid is hydrogenated.

10. A composite according to claim 1, wherein said solvent is water.

11. A composite according to claim 1, wherein said bioactive substance is a microorganism.

12. A composite according to claim 11, wherein said microorganism is yeast.

13. A composite according to claim 12, wherein said yeast is *Saccharomyces cerevisiae*.

14. A composite according to claim 12, wherein said yeast is INSTANT yeast.

15. A composite according to claim 11, wherein said microorganism is a probiotic.

16. A composite according to claim 1, wherein said bioactive substance is an enzyme.

17. A composite according to claim 1, wherein said bioactive substance is a vitamin.

18. A composite according to claim 1, wherein said bioactive substance is a mineral.

19. A composite according to claim 1, wherein said bioactive substance is an antioxidant.

20. A method for controlling rate of release of a bioactive substance from an encapsulated composite upon exposure to a solvent, the method comprising:
   (a) blending an emulsifiable lipid with an amount of one or more additives to obtain a blend; and
   (b) coating the bioactive substance with the blend from step (a) to form an encapsulated bioactive substance composite;
wherein the emulsifiable lipid and additive are not the same, and wherein the rate of release of the bioactive substance from the encapsulated composite is decreased as the amount of additive is increased.

21. A method according to claim 20, wherein said bioactive substance is yeast.

22. A method according to claim 20, wherein said bioactive substance is a probiotic.

23. A method according to claim 20, wherein said bioactive substance is an enzyme.

24. A method according to claim 20, wherein said bioactive substance is a vitamin.

25. A method according to claim 20, wherein said bioactive substance is a mineral.

26. A method according to claim 20, wherein said bioactive substance is an antioxidant.

27. A method for controlling rate of release of a bioactive substance from an encapsulated composite upon exposure to a solvent, the method comprising:
   (a) blending an emulsifiable lipid with an amount of one or more additives to obtain a blend; and
   (b) coating the bioactive substance with the blend from step (a) to form an encapsulated bioactive substance composite;
   wherein the emulsifiable lipid and additive are not the same, and wherein the rate of release of the bioactive substance from the encapsulated composite is increased as the amount of additive is decreased.

28. A method according to claim 27, wherein said bioactive substance is yeast.

29. A method according to claim 27, wherein said bioactive substance is a probiotic.

30. A method according to claim 27, wherein said bioactive substance is an enzyme.

31. A method according to claim 27, wherein said bioactive substance is a vitamin.

32. A method according to claim 27, wherein said bioactive substance is a mineral.

33. A method according to claim 27, wherein said bioactive substance is an antioxidant.

34. A method for controlling rate of release of a bioactive substance from an encapsulated composite upon exposure to a solvent, the method comprising coating the bioactive substance with an amount of an emulsifiable lipid to form an encapsulated bioactive substance composite, wherein the rate of release of the bioactive substance from the encapsulated composite is decreased as the amount of emulsifiable lipid based on total weight of the encapsulated composite is increased.

35. A method according to claim 34, wherein the emulsifiable lipid consists essentially of one or more monoglycerides.

36. A method according to claim 34, wherein the bioactive substance is yeast.

37. A method for controlling rate of release of a bioactive substance from an encapsulated composite upon exposure to a solvent, the method comprising coating the bioactive substance with an amount of an emulsifiable lipid to form an encapsulated bioactive substance composite, wherein the rate of release of the bioactive substance from the encapsulated composite is increased as the amount of emulsifiable lipid based on total weight of the encapsulated composite is decreased.

38. A method according to claim 37, wherein the emulsifiable lipid consists essentially of one or more monoglycerides.

39. A method according to claim 37, wherein the bioactive substance is yeast.

40. A food composition comprising an encapsulated bioactive substance composite according to claim 1.

41. A composition according to claim 40, wherein the food composition is a dry mix package.

42. A composition according to claim 41, wherein the dry mix package is a dry drink mix.

43. A composition according to claim 40, wherein the food composition is a dough.

44. A composition according to claim 43, wherein the dough is a frozen dough.

45. A composition according to claim 43, wherein the dough is a refrigerated dough.

46. A method for preparing a food product and/or animal feed product comprising:
   (a) combining an encapsulated bioactive substance composite according to claim 1 with other ingredients; and
   (b) subjecting said combination from step (a) to a solvent which releases said bioactive substance.

47. A method according to claim 46, wherein said combination from step (a) is a dry mix package.

48. A method according to claim 46, wherein said combination from step (b) is dough.

49. A method according to claim 47, wherein said dry mix package is stored at room temperature.

50. A method according to claim 48, further comprising proofing and baking said dough.

51. A method according to claim 46, wherein said food product is a bakery product.

52. A method according to claim 46, wherein said animal feed product is an animal pellet.

53. A food product and/or animal feed product prepared according to a method comprising:
   (a) combining an encapsulated bioactive substance composite according to claim 1 with other ingredients; and
   (b) subjecting said combination from step (a) to a solvent which releases said bioactive substance.

54. A food product according to claim 53, wherein said combination from step (a) is a dry mix package.

55. A food product according to claim 53, wherein said composition from step (b) is a dough.

56. A food product according to claim 55, wherein said dough is a frozen or refrigerated dough.

57. A food product according to claim 55, wherein said dough is proofed and then baked.

58. A food product according to claim 53, wherein said food product is pizza crust.

59. A food product according to claim 53, wherein said food product is a bakery product.

60. A food product according to claim 53, wherein said food product is a dietary supplement.

61. A food product according to claim 53, wherein said food product is a dairy product.

62. An animal feed product according to claim 53, wherein said animal feed product is animal pellets.

* * * * *